(12) United States Patent  (10) Patent No.: US 6,747,212 B1
Henry  (45) Date of Patent: Jun. 8, 2004

(54) ADAPTER ASSEMBLY FOR REMOVABLY CONNECTING CABLE PROTECTORS

(76) Inventor: Stephen K. Henry, 3825 Northbrook Dr.,#F, Boulder, CO (US) 80304

( * ) Notice: Subject to any disclaimer, the term of this patent is extended or adjusted under 35 U.S.C. 154(b) by 0 days.

(21) Appl. No.: 10/633,862

(22) Filed: Aug. 4, 2003

(51) Int. Cl.[7] ................................................ H02G 3/30
(52) U.S. Cl. ....................... 174/101; 174/50; 174/97; 14/69.5; 104/275
(58) Field of Search ................................ 174/50, 70 C, 174/70 R, 72 C, 97, 101; 14/69.5; 104/275

(56) References Cited

U.S. PATENT DOCUMENTS

| | | | |
|---|---|---|---|
| 72,028 A | 12/1867 | Haase | |
| 585,540 A | * 6/1897 | Spangler | 104/275 |
| 883,186 A | 3/1908 | Fine | |
| 1,914,830 A | 6/1933 | Kostohris | |
| 2,027,619 A | 1/1936 | Rutherford | |
| 2,166,031 A | 7/1939 | Wendell | |
| 2,594,425 A | 4/1952 | Greenberg | |
| 2,927,396 A | 3/1960 | Hall, Jr. | |
| 3,965,967 A | 6/1976 | Jentzsch et al. | |
| 4,067,258 A | 1/1978 | Valeri | |
| 4,101,100 A | 7/1978 | Smith et al. | |
| 4,373,306 A | 2/1983 | Rech | |
| 4,677,799 A | 7/1987 | Zarembo | |
| 4,817,224 A | 4/1989 | Visnaw et al. | |
| 4,819,910 A | 4/1989 | Johnston | |
| 5,095,822 A | 3/1992 | Martin | |
| 5,267,367 A | 12/1993 | Wegmann, Jr. | |
| 5,446,937 A | 9/1995 | Haskins | |
| D370,717 S | * 6/1996 | Ziaylek et al. | D23/266 |
| 5,566,622 A | 10/1996 | Ziaylek, Jr. et al. | |
| 5,777,266 A | 7/1998 | Herman et al. | |
| D412,490 S | 8/1999 | Henry | |
| 5,933,898 A | 8/1999 | Estes et al. | |
| D415,112 S | 10/1999 | Henry | |
| D415,471 S | 10/1999 | Henry | |
| D418,818 S | 1/2000 | Henry | |
| 6,067,681 A | * 5/2000 | Zeinstra et al. | 14/69.5 |
| D429,695 S | 8/2000 | Henry | |
| D436,578 S | 1/2001 | Henry | |
| D437,832 S | 2/2001 | Henry | |
| 6,202,565 B1 | 3/2001 | Henry | |
| 6,481,036 B1 | 11/2002 | Duvall | |
| 2002/0038716 A1 | 4/2002 | Pineda | |

FOREIGN PATENT DOCUMENTS

DE 20012041 U1 2/2001

* cited by examiner

Primary Examiner—Dean A. Reichard
Assistant Examiner—Adolfo Nino
(74) Attorney, Agent, or Firm—Dorr, Carson, Sloan, Birney & Kramer, P.C.

(57) ABSTRACT

An adapter assembly for removably connecting two parallel cable protectors having side ramps in an adjacent side-by-side relationship employs a central member to bridge the void between the side ramps of the cable protectors. A number of cable protector connectors extend from the central member to removably secure the cable protectors to the central member.

25 Claims, 10 Drawing Sheets

Figure 1:
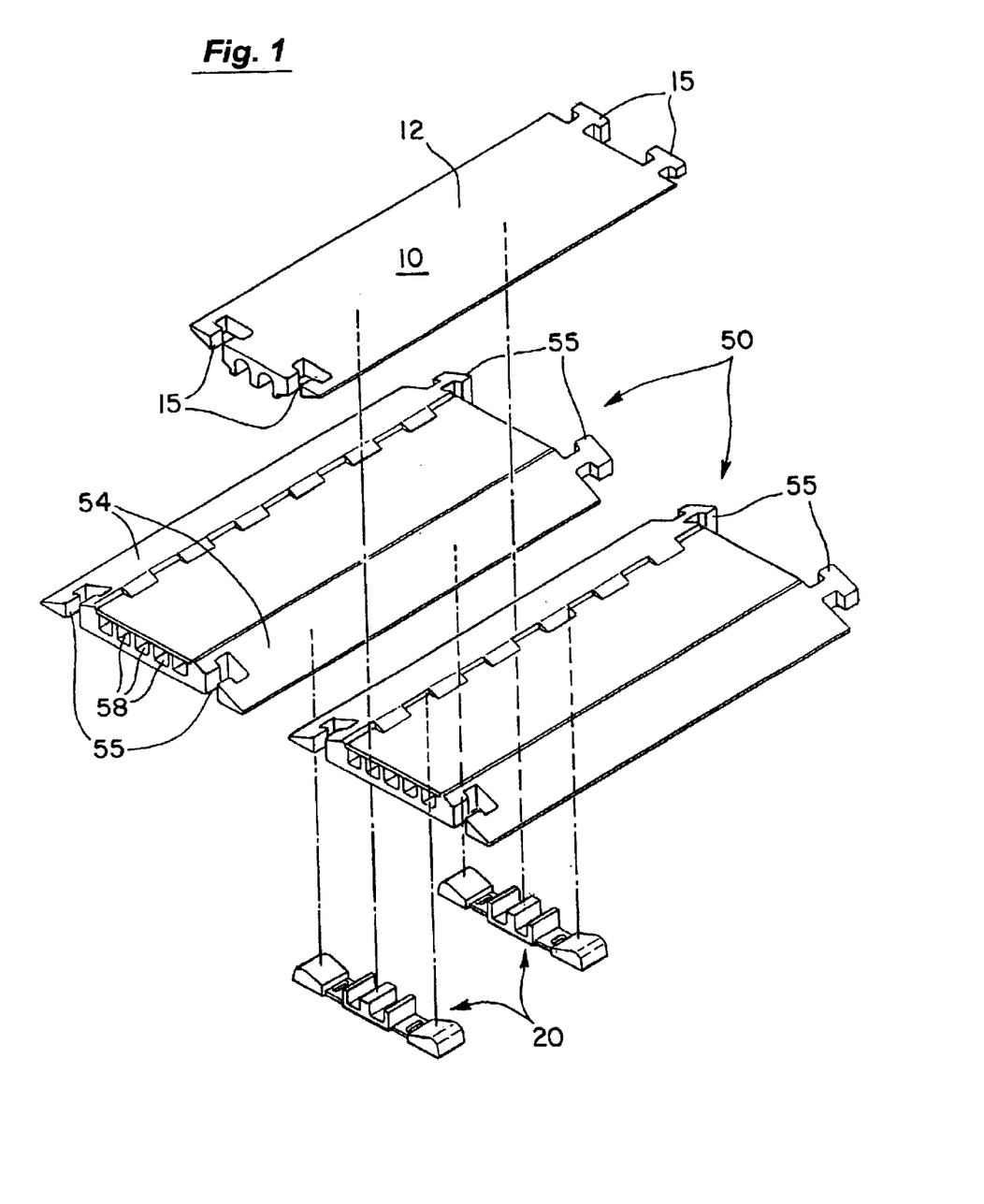
FIG. 1 is an exploded perspective view of the present invention connecting two cable protectors.
Figure 3:
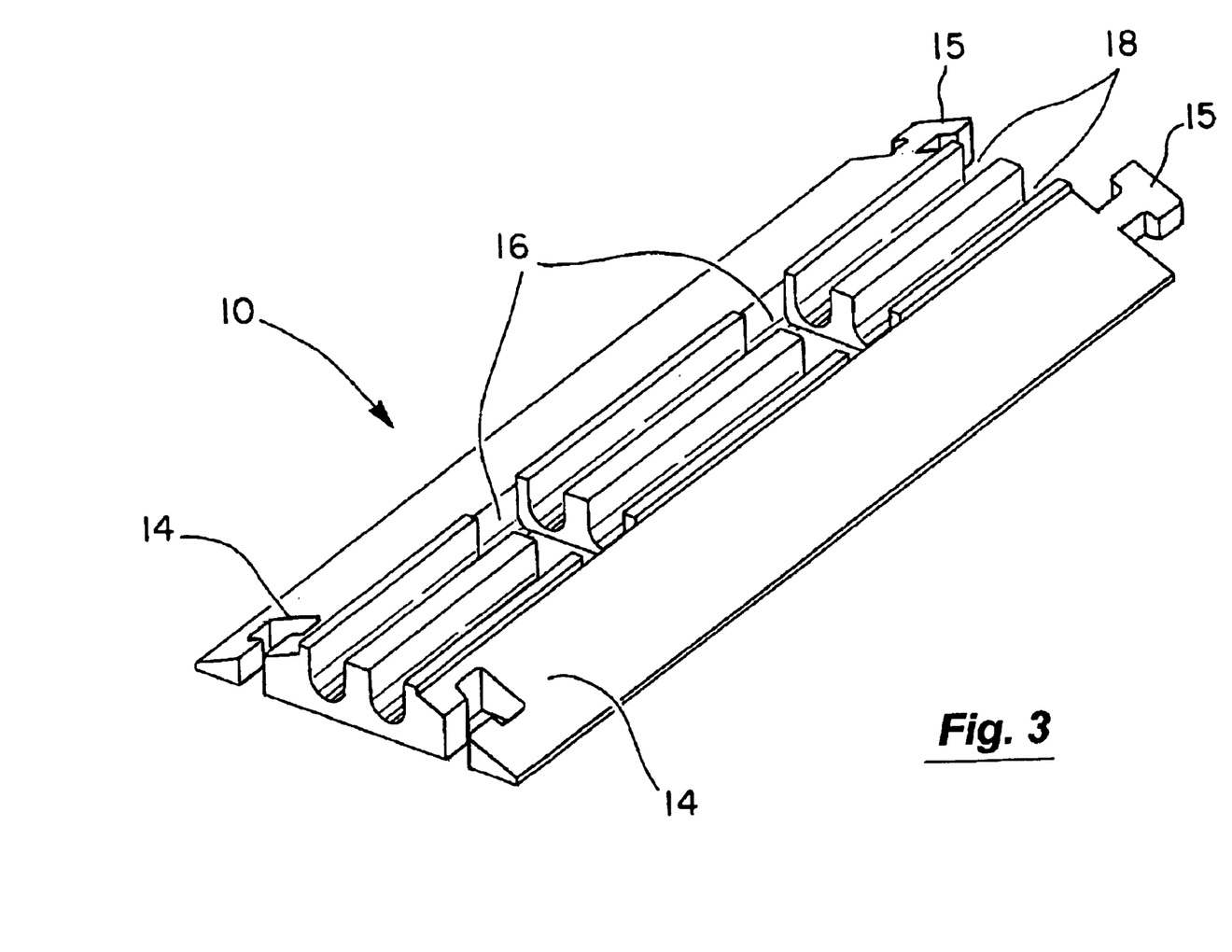
FIG. 3 is a bottom perspective view of the central member 10.

Fig. 10 though lateral surfaces 14 could also be curved or have other profiles. As shown in FIGS. 1 and 3, the central member 10 can also include longitudinal channels 16 extending along its bottom surface to receive and protect additional cables.

ADAPTER ASSEMBLY FOR REMOVABLY CONNECTING CABLE PROTECTORS

BACKGROUND OF THE INVENTION

1. Field of the Invention

The present invention relates generally to the field of modular cable protectors. More specifically, the present invention discloses an adapter assembly for removably connecting cable protectors in parallel.

2. Statement of the Problem

Hose and cable bridging protective devices have been used in the past to prevent damage for hoses, cables, wiring and the like by vehicles and pedestrians. These cable protectors also help to minimize the risk of pedestrians tripping over cables. For the purposes of this disclosure, the term "cable" should be broadly interpreted to include cables, hoses, electrical wiring, conduits, optical fibers, pneumatic tubing, plumbing, and the like.

Conventional cable protectors include one or more channels extending in parallel between the ends of the cable protector to receive the cables. Side ramps or beveled edges extend laterally outward from both sides of the cable protector to allow vehicles to roll over the top of the cable protector. Each cable protector typically includes a set of end connectors that enable a series of cable protectors to be attached together in a modular end-to-end fashion to any desired length.

A problem arises if two or more sets of cable protectors with side ramps must be used in parallel. This creates an uneven traveling surface with multiple inclines and declines for vehicles or pedestrians crossing the cable protectors. Therefore, a need exists for an adapter assembly that can be used to combine cable protectors in parallel to create a structure with a relatively uniform top surface. In addition, it is desirable to be able to hold sets of cable protectors in fixed lateral positions relative to one another so as to minimize movement and stress on the cables.

3. Solution to the Problem

Nothing in the prior art shows a adapter assembly for removably connecting two cable protectors having side ramps in an adjacent side-by-side relationship. The present invention bridges the void between adjacent cable protectors and also fixes the relative positions of parallel sets of cable protectors. Optionally, the present invention can include channels to carry additional cables.

SUMMARY OF THE INVENTION

This invention provides an adapter assembly for removably connecting two parallel cable protectors having side ramps in an adjacent side-by-side relationship. A central member bridges the void between the side ramps of the cable protectors. A number of cable protector connectors extend from the central member to removably secure the cable protectors to the central member.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 6:
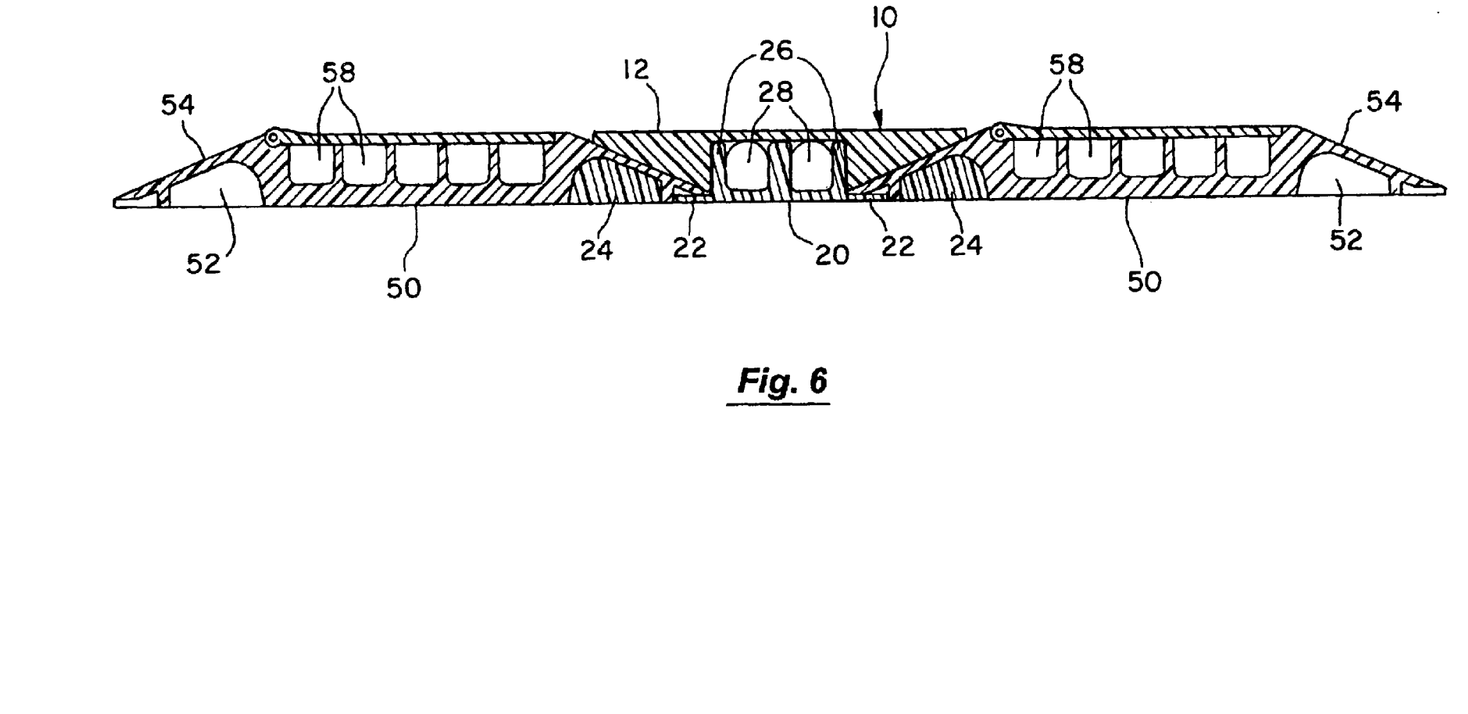
FIG. 6 is a cross-sectional view of the present invention connecting two cable protectors 50 taken along a vertical plane extending through a base member 20.

Turning to FIG. 1, a top perspective view is provided showing the present invention connecting two cable protectors 50. The present invention is intended for use with any of a wide range of commercially-available cable protectors. Each cable protector 50 typically includes a plurality of recessed channels 58 extending in parallel between the opposing ends of the cable protector 50. These channels 58 are intended to receive one or more cables, hoses, or the like. Optionally, a flat hinged lid can be used to cover the channels and their cables. Two side ramps 54 extend laterally outward from the sides of the cable protector 50. These side ramps 54 have a predetermined slope so that small vehicles and carts can roll up one side ramp, over the top of the cable protector, and down the other side ramp. The side ramps 54 also help to prevent pedestrians from tripping over the cable protector or cables, as previously discussed. The ends of each cable protector 50 are equipped with complementary sets of end connectors 55 that enable a series of cable protectors to be attached together in a modular, end-to-end relationship to any desired length. For example, the end connectors 55 can be shaped as male and female T-shaped connectors as shown in FIG. 1. As shown in FIG. 6, a series of recesses or voids 52 are typically molded into the bottom of cable protector 50, and particularly the bottom surface of the side ramps 54. These recesses 52 reduce the weight and cost of the cable protector 50 and simplify the molding process.

Returning to FIG. 1, the major components of the present invention are the central member 10 and a number of base members 20. The central member 10 bridges the void between the side ramps 54 of two cable protectors 50 placed in a parallel, side-by-side relationship with predetermined spacing. For example, the central member 10 can have a substantially trapezoidal cross-section. The upper surface 12 of the central member 10 extends between the cable protectors 50, and preferably provides a substantially continuous surface between the tops of the cable protectors 50. In the preferred embodiment of the present invention, the tapered lateral surfaces 14 of the central member 10 are angled to complement the side ramps 54 of the cable protectors 50 to increase structural strength and rigidity, Optionally, a number of recessed cable tracks or channels 18 extend in parallel along the length of the bottom of the central member 10 to hold cables and the like, as depicted in the bottom perspective view shown in FIG. 3. This enables the central member 10 to supplement the cable-carrying capacity of the cable protectors 50. In addition, a number of recesses 16 can be provided in the bottom of the central member 10 to engage the base members 20, as will be described below.

Optionally, the central member 10 can be equipped with a number of end connectors 15 to removably engage additional central members in an end-to-end or series relationship. For example, the end connectors 15 can be male and female T-shaped connectors, as illustrated in FIGS. 1 and 3. However, other types of connectors could be readily substituted.

Figure 2:
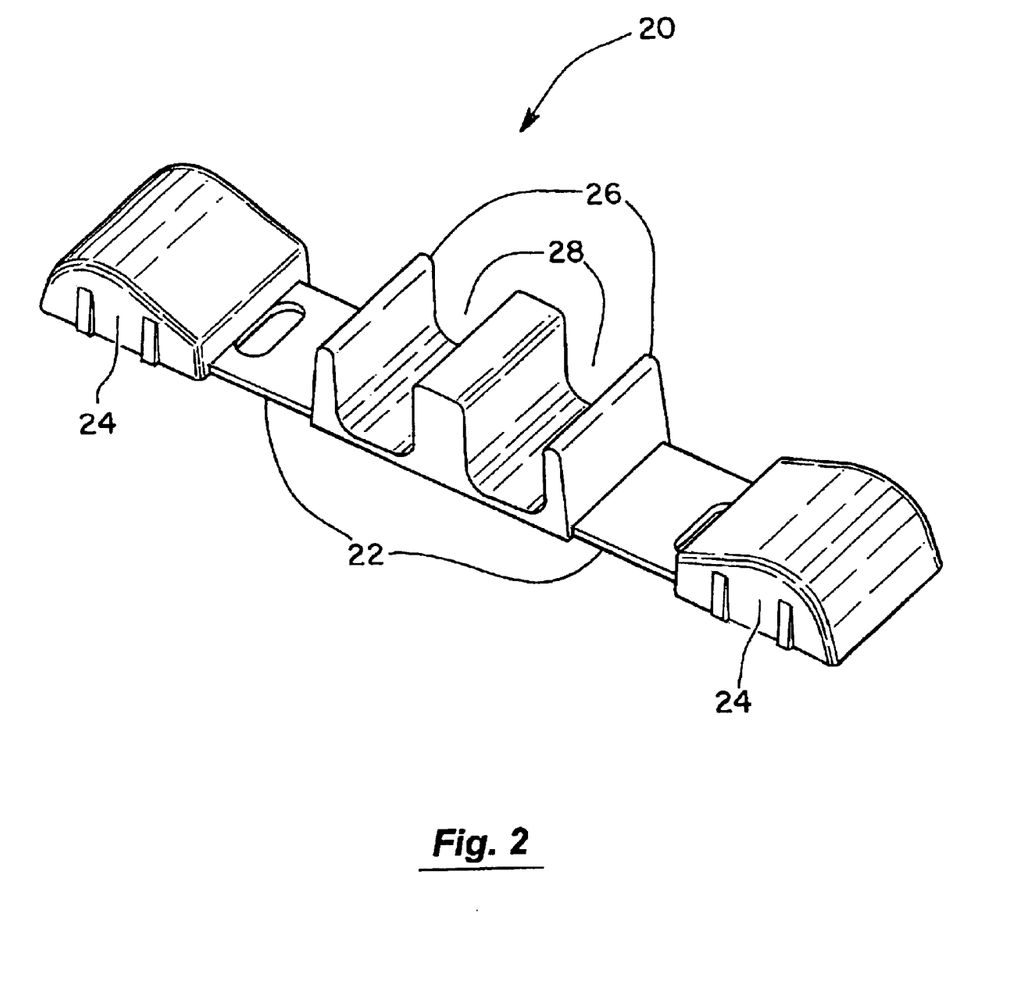
FIG. 2 is a top perspective view of the base member 20.
Figure 4:
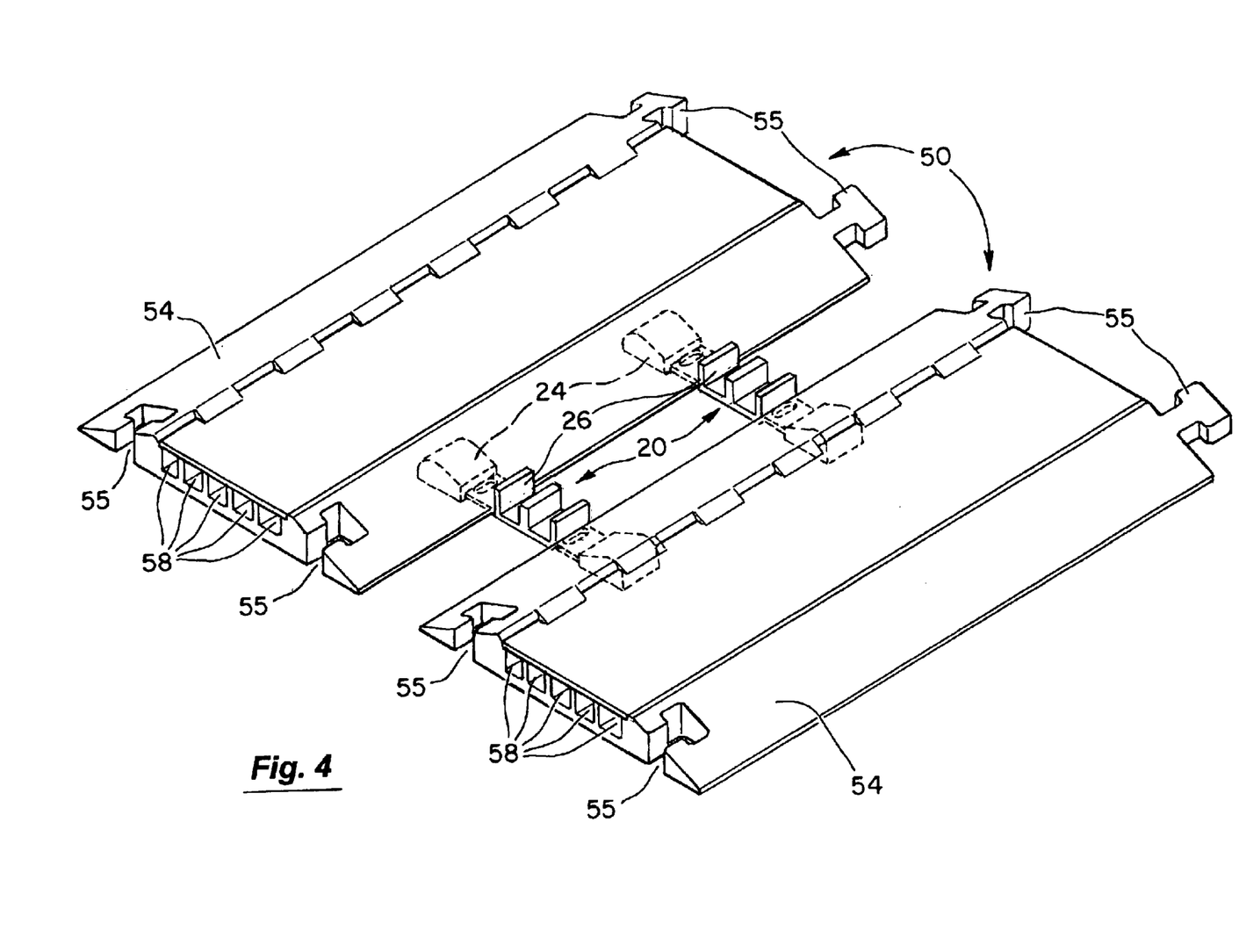
FIG. 4 is a top perspective view of two cable protectors 50 attached by two base members 20.

The preferred embodiment of the base member 20 is shown greater detail in the top perspective view of FIG. 2 Each base member 20 extends beneath the central member 10 and at least a portion of both adjoining cable protectors 50. For example, the base member 20 can be equipped with lateral arms 22 that extend outward from the body of the base member 20 and underlie the side ramps 54 of the cable protectors 50. Cable protector connectors 24 on the ends of the lateral arms 22 removably engage the bottoms of both cable protectors 50 as shown in FIG. 4. For example, the cable protector connector 24 can be a protrusion extending upward from a lateral arm 22 of the base member 20, as shown in FIG. 2 to removably engage a corresponding recess 52 in the bottom of a cable protector 50, as illustrated in FIGS. 4 and 6. This configuration is preferable because of the recesses 52 that have been molded into many existing cable protectors 50. However, other alternative configurations could be readily substituted to secure the base members 20 to both cable protectors 50. For example, the placements of the recess 52 and protrusion 24 could be reversed. Pins, tabs, snaps, hook-and-eye connectors, or snap mechanisms could also be used.

Figure 5:
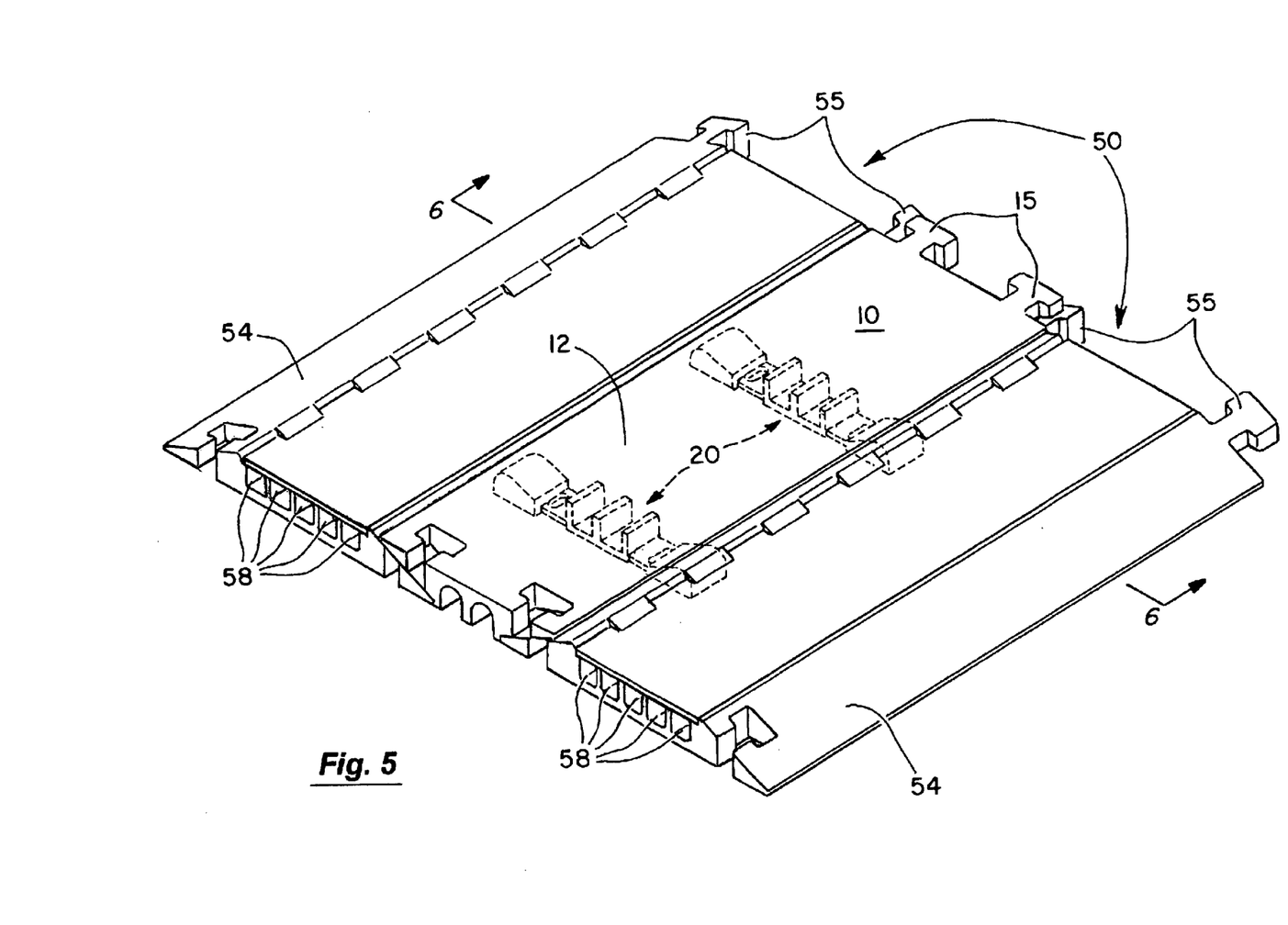
FIG. 5 is a top perspective view corresponding to FIG. 4 after the central member 10 has been attached to the base members 20.

Each base member 20 also includes at least one central member connector 26 that removably engages the base member 20 to the central member 10. FIG. 5 is a top perspective view of the assembly after the central member 10 has been attached to the base members 20. FIG. 6 is a corresponding vertical cross-sectional view of the finished assembly. For example, the central member connector 26 can be a protrusion that engages the recesses 16 in the bottom of the central member 10 as shown in FIG. 6 by a frictional fit. Alternatively, the central member connector 26 on the base member 20 could be a recess that engages a corresponding protrusion on the central member 10. Any of a wide variety of conventional connectors could be substituted to secure the central member 10 to the base members 20.

In yet another embodiment, the central member 10 and base members 20 could be formed as a single piece. In other words, the lateral arms 22 and cable protector connectors 24 could be components of the central member 10.

The embodiment of the base member 10 shown in FIGS. 1–6 has a relatively short length. A plurality of base members would typically be used to secure the central member 10 to the cable protector 50. For example, the cable protectors 50 shown in the drawings have two recesses 16 on the bottom of each side ramp 54, and therefore could accommodate two base members 20 for this purpose. This embodiment also has central member connectors 26 that incorporate partial cable tracks 28, which complement the cable tracks 18 on the bottom of the central member 10. Thus, the base members 20 combine with the central member 10 to form a complete set of cable channels extending the length of the central member 10.

Figure 7:
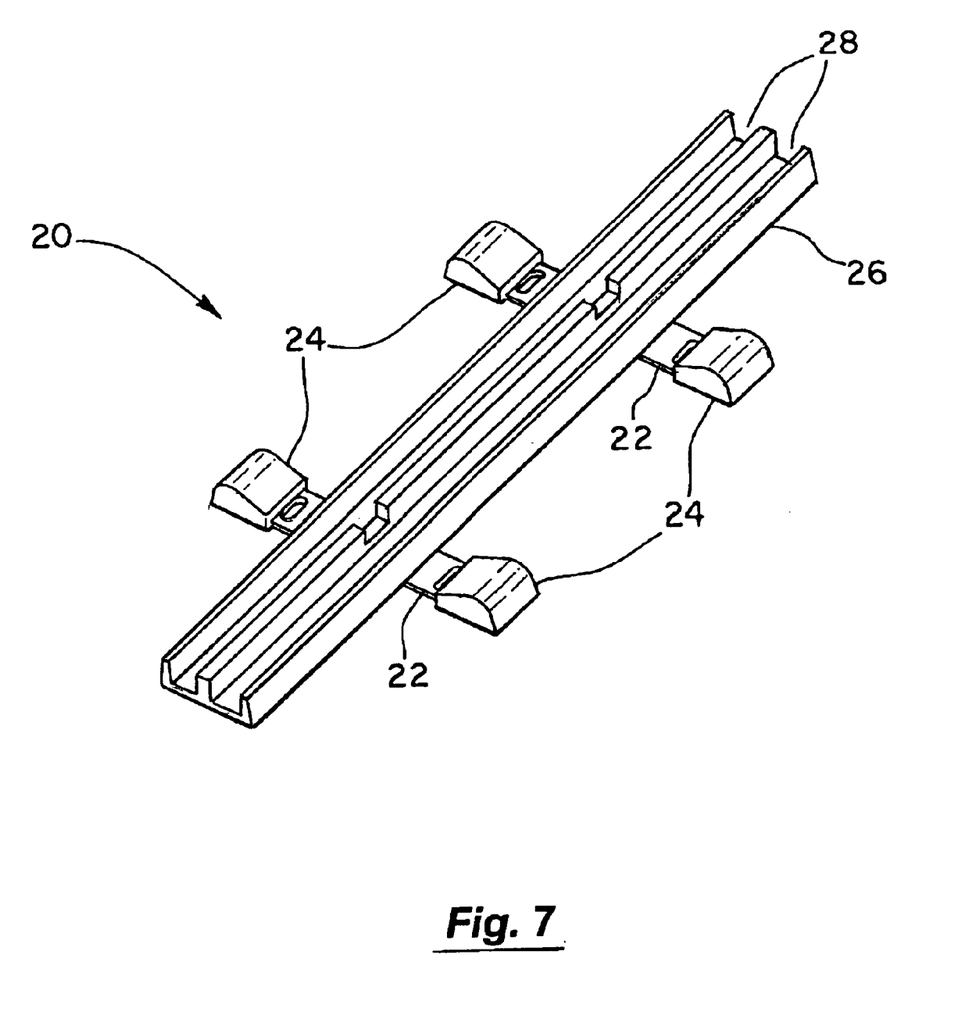
FIG. 7 is a top perspective view of a second embodiment of the base member 20.
Figure 8:
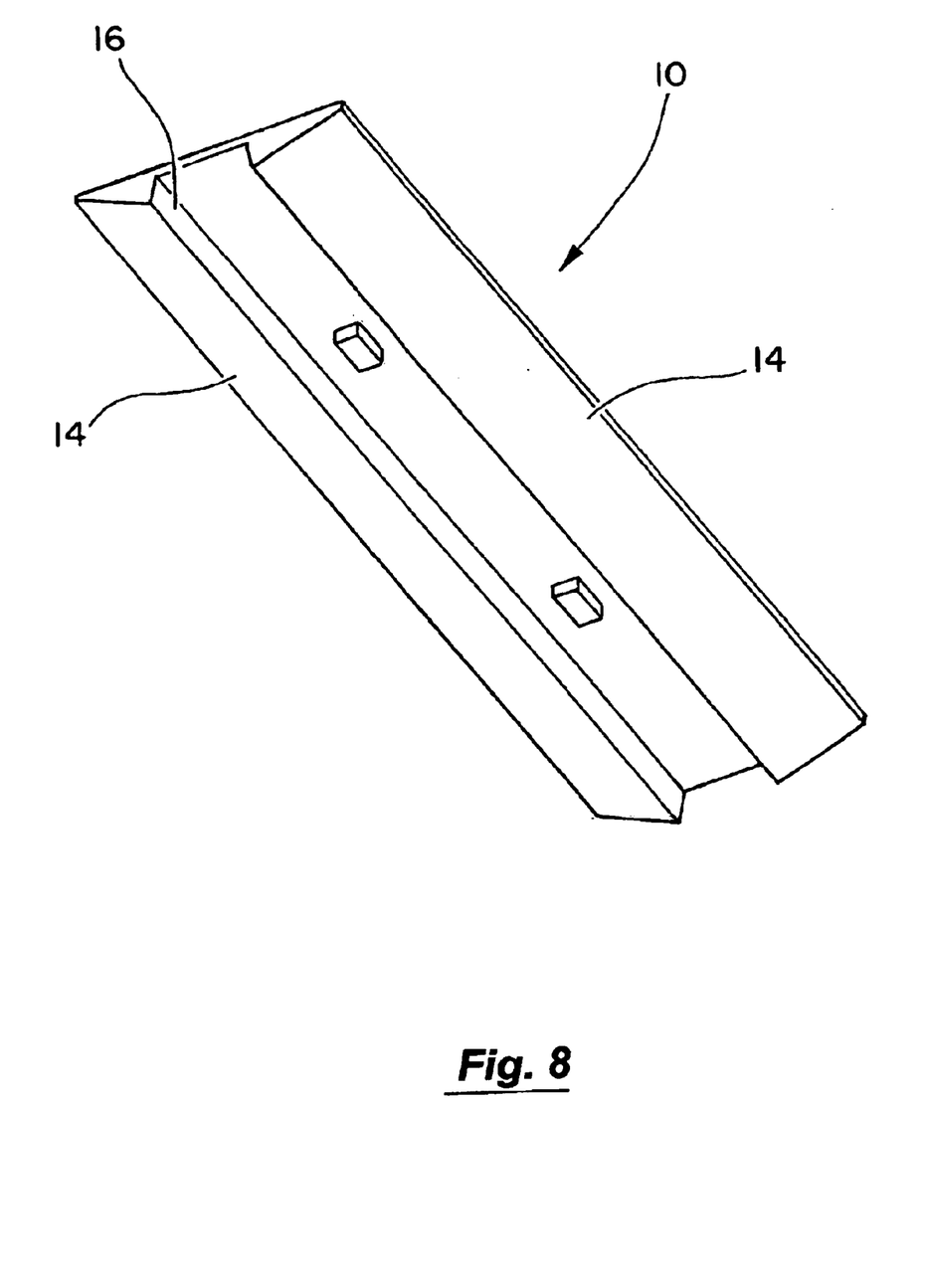
FIG. 8 is a bottom perspective view of a second embodiment of the central member 10 intended for use with the base member 20 depicted in FIG. 7.
Figure 9:
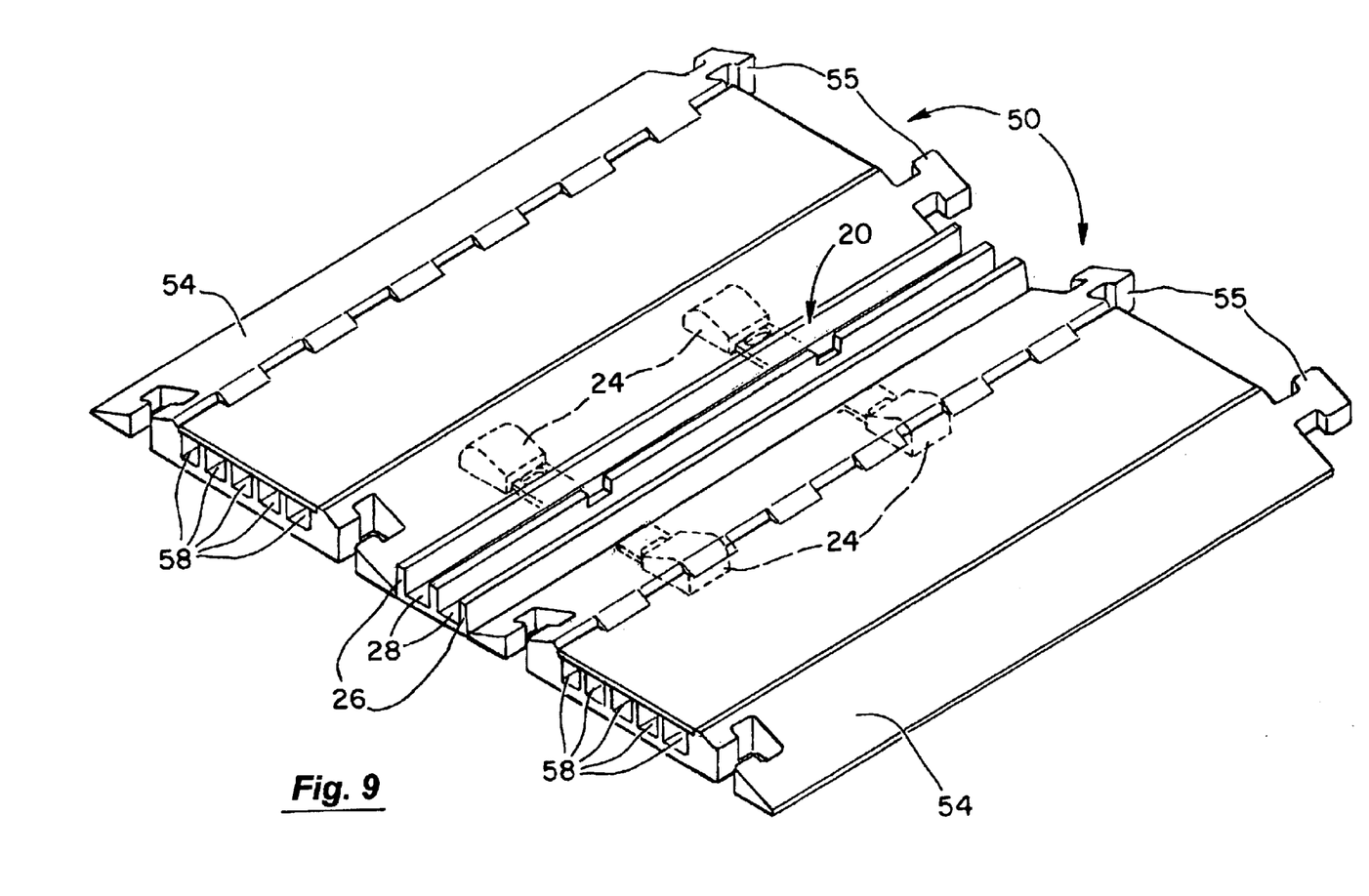
FIG. 9 is a top perspective view of two cable protectors 50 attached by the base member 20 depicted in FIG. 7.
Figure 10:
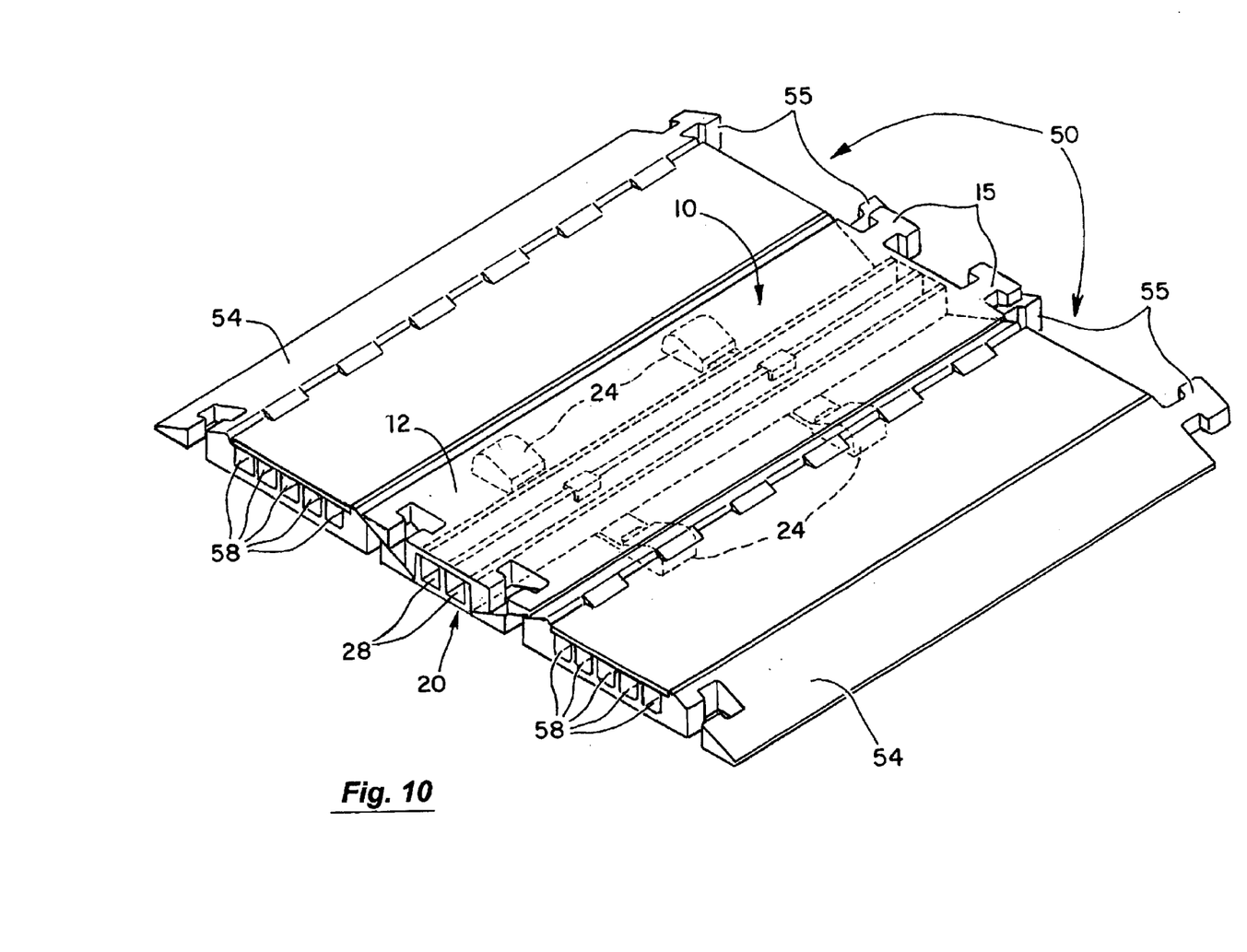
FIG. 10 is a top perspective view corresponding to FIG. 9 after the central member 10 has been attached to the base member 20.

In contrast, the embodiment of the base member 20 shown in FIGS. 7 through 10 extends along the entire length of the central member 10, so that only a single base member 20 is employed for each central member 10. In this embodiment, a continous recess 16 extends along the length of the bottom of the central member 10, as shown in the bottom perspective view in FIG. 8. The base member 20 also includes cable tracks 28 that extend along its entire length, as shown in FIGS. 7 and 9. In this embodiment, the base member 20 extends the length of the cable protectors 50 and include two pairs of the cable protector connectors 24 that removably engage recesses in the bottoms of the cable protectors 50, as illustrated in FIG. 9. FIG. 10 is a perspective view of the finished assembly. The central member connectors 26 secure the base member 10 to the recess 16 in the central member 20 along its entire length.

The components of the present invention can be made of any of a wide variety of materials, such as plastics, metal, wood, or composite materials. Many cable protectors currently on the market are made of high density polyurethane due to its desirable combination of strength, durability, ease of molding, and relatively low weight. Polyurethane material is also well suited for fabricating the central member 10 and base members 20. However, it should be expressly understood that other materials could be readily substituted.

The above disclosure sets forth a number of embodiments of the present invention. Other arrangements or embodiments, not precisely set forth, could be practiced under the teachings of the present invention and as set forth in the following claims.

I claim:

1. An adapter assembly for removably connecting two parallel cable protectors having side ramps in an adjacent side-by-side relationship, said adapter assembly comprising:
   a central member bridging the void between the side ramps of two cable protectors placed in a parallel, side-by-side relationship with predetermined spacing and having an upper surface extending between the cable protectors; and
   cable protector connectors extending from the central member to removably secure the cable protectors to the central member.

2. The adapter assembly of claim 1 wherein the cable protector connector removably engages the bottom of the cable protectors.

3. The adapter assembly of claim 1 further comprising:
   a base member extending beneath the central member and at least a portion of both cable protectors; and wherein said cable protector connectors extend from the base member to removably engage the bottoms of the cable protectors.

4. The adapter assembly of claim 3 wherein the cable protector connectors comprise a protrusion extending upward from the base member to removably engage a corresponding recess in the bottom of the cable protectors.

5. The adapter assembly of claim 3 wherein the base member further comprises a central member connector removably engaging the base member to the central member.

6. The adapter assembly of claim 3 wherein the base member further comprises at least one track for holding a cable.

7. The adapter assembly of claim 3 wherein the base member extends the length of the central member.

8. The adapter assembly of claim 1 wherein the central member has a substantially trapezoidal cross-section.

9. The adapter assembly of claim 1 wherein the central member further comprises an end connector for removably engaging a second central member in an end-to-end relationship.

10. The adapter assembly of claim 1 wherein the central member further comprises an upper surface providing a substantially continuous surface between the cable protectors.

11. The adapter assembly of claim 1 further comprising tapered lateral edges complementing the side ramps of the cable protectors.

12. The adapter assembly of claim 1 wherein the central member further comprises at least one track for holding a cable extending the length of the central member.

13. An adapter assembly for removably connecting two parallel cable protectors having side ramps in an adjacent side-by-side relationship, said adapter assembly comprising:
   a central member bridging the void between the side ramps of two cable protectors placed in a parallel, side-by-side relationship with predetermined spacing and having:
      (a) an upper surface extending between the cable protectors; and
      (b) tapered lateral edges complementing the side ramps of the cable protectors; and
   at least one base member having:
      (a) lateral arms extending beneath both cable protectors;
      (b) cable protector connectors on the lateral arms to removably engage the cable protectors and thereby secure the cable protectors to the base member; and
      (c) a central member connector to removably secure the base member to the bottom of the central member.

14. The adapter assembly of claim 13 wherein the cable protector connectors comprise a protrusion extending upward from the base member to removably engage a corresponding recess in the bottom of the cable protectors.

15. The adapter assembly of claim 13 wherein the central member has a substantially trapezoidal cross-section.

16. The adapter assembly of claim 13 wherein the central member further comprises an end connector for removably engaging a second central member in an end-to-end relationship.

17. The adapter assembly of claim 13 wherein the central member further comprises at least one track for holding a cable extending the length of the central member.

18. An adapter assembly for removably connecting two parallel cable protectors having side ramps in an adjacent side-by-side relationship, said adapter assembly comprising:
   a central member bridging the void between the side ramps of two cable protectors placed in a parallel, side-by-side relationship with predetermined spacing and having:
      (a) an upper surface extending between the cable protectors; and
      (b) at least one track extending along the length of the bottom of the central member to hold cables; and
   a base member having:
      (a) lateral arms extending beneath both cable protectors;
      (b) cable protector connectors on the lateral arms to removably engage the cable protectors and thereby secure the cable protectors to the base member; and
      (c) a central member connector to removably secure the base member to the bottom of the central member, said central member connector having at least one track extending along the length of the central member to complement the tracks of the central member.

19. The adapter assembly of claim 18 wherein the central member further comprises a recess in the bottom of the central member to removably engage the central member connector of the base member.

20. The adapter assembly of claim 18 wherein the cable protector connectors comprise a protrusion extending upward from the base member to removably engage a corresponding recess in the bottom of the cable protectors.

21. The adapter assembly of claim 18 wherein the base member extends the length of the central member.

22. An adapter assembly for removably connecting two parallel cable protectors having side ramps in an adjacent side-by-side relationship, said adapter assembly comprising:
   a central member bridging the void between the side ramps of two cable protectors placed in a parallel, side-by-side relationship with predetermined spacing and having:
      (a) an upper surface extending between the cable protectors; and
      (b) a recess extending along the length of the bottom of the central member; and
   a base member having:
      (a) lateral arms extending beneath both cable protectors;
      (b) cable protector connectors on the lateral arms to removably engage the cable protectors and thereby secure the cable protectors to the base member; and
      (c) a central member connector to removably secure the base member to the recess in the central member, said central member connector having at least one track extending along the length of the central member to hold cables.

23. The adapter assembly of claim 22 wherein the cable protector connectors comprise a protrusion extending upward from the base member to removably engage a corresponding recess in the bottom of the cable protectors.

24. The adapter assembly of claim 22 wherein the base member extends the length of the central member.

25. The adapter assembly of claim 22 wherein the central member further comprises an end connector for removably engaging a second central member in an end-to-end relationship.

* * * * *